US012632973B2

(12) United States Patent
DeVenecia et al.

(10) Patent No.: US 12,632,973 B2
(45) Date of Patent: May 19, 2026

(54) SYSTEM AND METHOD FOR TARGETING FROM 3D DIGITAL SURFACE MODELS AND DIGITAL POINT POSITIONING DATABASE CONTROLLED STEREO IMAGERY

(71) Applicant: BAE Systems Information and Electronic Systems Integration Inc., Nashua, NH (US)

(72) Inventors: Kurt J. DeVenecia, Ramona, CA (US); Brett A. Withee, San Diego, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 385 days.

(21) Appl. No.: 18/363,433

(22) Filed: Aug. 1, 2023

(65) Prior Publication Data

US 2025/0045939 A1     Feb. 6, 2025

(51) Int. Cl.
*G06T 7/33*          (2017.01)
*G06T 7/60*          (2017.01)
(Continued)

(52) U.S. Cl.
CPC ................ *G06T 7/344* (2017.01); *G06T 7/60* (2013.01); *G06T 7/75* (2017.01); *G06V 20/653* (2022.01);
(Continued)

(58) Field of Classification Search
CPC .. G06T 7/344; G06T 7/60; G06T 7/75; G06T 2207/10012; G06T 2207/10032;
(Continued)

(56) References Cited

U.S. PATENT DOCUMENTS 8,427,505 B2     4/2013   Karp et al.
8,458,188 B2     6/2013   Salemann
(Continued)

OTHER PUBLICATIONS

International Search Report, PCT/24/40263, mailed Jul. 17, 2025, 10 pages.
(Continued)

*Primary Examiner* — Stephen R Koziol
*Assistant Examiner* — Michael Kim Maiden
(74) *Attorney, Agent, or Firm* — Sand, Sebolt & Wernow LPA; Gary McFaline

(57)          ABSTRACT

A computer program product and corresponding method for targeting one or more points in a three dimensional (3D) model is provided. The computer program product including least one non-transitory computer readable storage medium in operative communication with a computer processing unit (CPU), the storage medium having instructions stored thereon that, when executed by the CPU, implement a process to register the 3D model with a stereoscopic image pair. The steps performed include inputting a first image and a second image that define a stereoscopic image pair into an object targeting program, wherein an object is shown in the first image and the second image, inputting a three dimensional (3D) model of the object into the object targeting program, registering the 3D model to the stereoscopic image pair, and targeting a point associated with or near the object based on the 3D model having been registered to the stereoscopic image pair.

16 Claims, 4 Drawing Sheets

(51) Int. Cl.
    *G06T 7/73*         (2017.01)
    *G06V 20/64*       (2022.01)

(52) U.S. Cl.
    CPC .............. *G06T 2207/10012* (2013.01); *G06T 2207/10032* (2013.01); *G06T 2207/30184* (2013.01); *G06T 2207/30212* (2013.01)

(58) Field of Classification Search
    CPC   G06T 2207/30184; G06T 2207/30212; G06V 20/653
    See application file for complete search history.

(56) References Cited

U.S. PATENT DOCUMENTS

| | | | |
|---|---|---|---|
| 8,818,076 | B2 | 8/2014 | Shenkar et al. |
| 10,609,353 | B2 | 3/2020 | Zhang |
| 11,094,113 | B2 | 8/2021 | Mundy et al. |
| 11,200,353 | B2 | 12/2021 | Lachinski et al. |
| 11,302,071 | B1 | 4/2022 | Boudreaux et al. |
| 2005/0151839 | A1* | 7/2005 | Ito ........................... G06T 7/593 |
| | | | 348/42 |
| 2011/0007948 | A1* | 1/2011 | Oldroyd ................. G01C 11/00 |
| | | | 382/106 |
| 2021/0174580 | A1* | 6/2021 | Mundy ................... G06T 15/06 |
| 2021/0349922 | A1 | 11/2021 | Hsu et al. |
| 2022/0108522 | A1* | 4/2022 | Haramaty .............. G06T 17/05 |

OTHER PUBLICATIONS

Kurt Devenecia and Chris Mazur, Socet GVP and GXP InMotion Desktop v4.5.0.3 release enhancements, Presented NGA's Photogrammetry 3D and LiDAR (P3DL) conference virtually, Jun. 2021, GEOINT Denver Colorado, Apr. 2022, and I/ITSEC Orlando Florida, Dec. 2022.

\* cited by examiner 14,14A

18

20

14,14B

18

20

16

22

18

20

SYSTEM AND METHOD FOR TARGETING FROM 3D DIGITAL SURFACE MODELS AND DIGITAL POINT POSITIONING DATABASE CONTROLLED STEREO IMAGERY

TECHNICAL FIELD

The present disclosure relates to imagery-based targeting systems and methods.

BACKGROUND ART

SOCET GXP® is a comprehensive geospatial intelligence software suite offered by BAE Systems. The system is designed to provide advanced image processing and analysis capabilities for satellite and aerial imagery. SOCET GXP integrates multiple geospatial data sources to create detailed and accurate geospatial products, including maps, 3D models, and terrain analyses.

The system is used extensively by military, law enforcement, emergency services and intelligence agencies, as well as other organizations with a need for high-quality geospatial and temporal information. Some features of SOCET GXP include: (1) Image processing and exploitation: SOCET GXP can ingest a wide variety of image formats and apply sophisticated processing algorithms to enhance image quality and extract valuable information. (2) Terrain modeling: The system can generate high-resolution 3D terrain models from imagery data, which can be used for a range of applications, including simulation and training. (3) GIS data integration: SOCET GXP can integrate data from multiple GIS sources, including vector and raster data, to provide a comprehensive view of a geographic area. (4) Collaboration and dissemination: SOCET GXP includes tools for sharing and collaborating on geospatial products, including web-based portals and integration with other software systems.

SOCET GXP can produce a Digital Surface Model (DSM) however other programs or software can produce DSMs as well. Regardless of which is utilized to create a DSM, a system designer uses the program to create and visualize a three dimensional (3D) display. DSMs are easy to visualize and use for location measurement. Since DSMs may not contain accuracy information, the derived measurements do not have estimates for the accuracy of derived measurements including placement of points (latitude, longitude, height). For targeting solutions, the location and estimates of accuracy are important. If the DSMs do contain accuracy information, visualization of measurements on both 3D and imagery confirm the measurements are correct.

The measurements for targeting solutions typically come from placing points on a Digital Point Positioning Database (DPPDB). A DPPDB is a source of high-quality geospatial data that are used in targeting solutions like SOCET GXP. A DPPDB contains precise geospatial information about points on the Earth's surface, including their latitude, longitude, and elevation. When using SOCET GXP for targeting, users typically place points on the DPPDB to obtain accurate measurements for various purposes. For example, points can be placed to determine the location and coordinates of a target of interest, to calculate the distance between two points, or to measure the size and shape of an object. Once points are placed on the DPPDB, SOCET GXP can use its advanced image processing and analysis capabilities to extract additional information from the imagery. For example, SOCET GXP can automatically calculate the distance between two points, generate a three-dimensional model of the terrain, or create a detailed map of the area of interest. Overall, the DPPDB provides a valuable source of precise geospatial information that is used in conjunction with SOCET GXP and other targeting solutions to generate accurate and detailed targeting information.

SUMMARY OF THE INVENTION

Although SOCET GXP excels in its imagery analysis, targeting from 3D DSMs provides a mechanism for future targeting solutions by using current workflows and associated accredited data. However, using DPPDB products alone is difficult when considering that stereo displays of imagery are required, as well as the associated training thereof. To overcome the computer-centric problems associated with the usage of stereo imagery and to provide a practical application of simplifying the workflow, embodiments of the present disclosure link the 3D display of the DSM with the stereo display of DPPDB to allow the confirmation of point measurements. The point measurement are made on the 3D display and verified on the DPPDB stereo display. With little training, a targeting analyst or computer logic can make measurements quickly and accurately.

One embodiment of the present disclosure utilizes a registered 3D Tile Mesh or model data that is viewed in 3D. The present disclosure provides a computer program product that creates a workflow for point dropping. In one exemplary embodiment, there is a linked split-screen stereo images that provide point placement verification along with Latitude, Longitude, Height, Circular Error (CE), Linear Error (LE), and Total Linear Error (TLE). One exemplary 3D Tile Mesh sources is Vricon One World Terrain. However, other 3D tile mesh sources that can provide a 3D model is Google Maps, amongst many others.

In one aspect, an exemplary embodiment of the present disclosure may provide a computer program product for targeting one or more points in a 3D model, the computer program product including at least one non-transitory computer readable storage medium in operative communication with a computer processing unit (CPU), the storage medium having instructions stored thereon that, when executed by the CPU, implement a process to register the 3D model with a stereoscopic image pair, the process comprising: receiving a first stereoscopic image and a second stereoscopic image that define the stereoscopic image pair, wherein an object is shown in the first stereoscopic image and the second stereoscopic image; receiving a 3D model of the object; and registering the 3D model to the stereoscopic image pair. This exemplary embodiment or another exemplary embodiment may further include measuring a portion of the object in the first stereoscopic image of the stereoscopic image pair; measuring the portion of the object in the second stereoscopic image of the stereoscopic image pair; measuring the portion of the object in the 3D model, wherein all three measuring steps may occur simultaneously; and establishing a ground truth based on a first dimension of the portion of the object in the first and second stereoscopic images of the stereoscopic image pair having been measured. This exemplary embodiment or another exemplary embodiment may further include measuring the portion of the object in the 3D model; and determining whether a second dimension of the portion of the object measured in the 3D model matches the ground truth of the first dimension of the portion of the object in the first and second stereoscopic images of the stereoscopic image pair. In this example, the stereo image pair would have been created using a validated peer-reviewed process by NGA or one of its contractors called a DPPDB. Mensuration on this product provides the location of the object along with an estimate of the accuracy for that object.

This exemplary embodiment or another exemplary embodiment may further provide that if is determined that the second dimension does not match the first dimension, then correcting, with a correction function, the second dimension to match the first dimension, and after correcting then linking the 3D model to the stereoscopic image pair; or if is determined that the second dimension matches the first dimension, then linking the 3D model to the stereoscopic image pair. This exemplary embodiment or another exemplary embodiment may further include selecting a point in the 3D model that is remote from the portion of the object after having linked the 3D model to the stereoscopic image pair; and obtaining geospatial information of the point in the 3D model, wherein the geospatial information is adapted to identify the point as a target. This exemplary embodiment or another exemplary embodiment may further include obtaining an error margin for the geospatial information of the point in the 3D model. This exemplary embodiment or another exemplary embodiment may further include obtaining geospatial information of the point in the first stereoscopic image and the second stereoscopic image of the stereoscopic image pair. This exemplary embodiment or another exemplary embodiment may further provide that obtaining geospatial information of the point in the first stereoscopic image and the second stereoscopic image of the stereoscopic image pair occurs simultaneous to obtaining geospatial information of the point in the 3D model. This exemplary embodiment or another exemplary embodiment may further include viewing a first text box displaying the geospatial information of the point in the first stereoscopic image of the stereoscopic image pair; viewing a second text box displaying the geospatial information of the point in the second stereoscopic image of the stereoscopic image pair; and viewing a third text box displaying the geospatial information of the point in the 3D model. This exemplary embodiment or another exemplary embodiment may further include displaying, in at least the third text box, an error margin that is associated with the geospatial information of the point.

In another aspect, an exemplary embodiment of the present disclosure may provide an object targeting method comprising: inputting a first stereoscopic image and a second stereoscopic image that define a stereoscopic image pair into an object targeting program, wherein an object is shown in the first stereoscopic image and the second stereoscopic image; inputting a 3D model of the object into the object targeting program; registering the 3D model to the stereoscopic image pair; and targeting a point associated with or near the object based on the 3D model having been registered to the stereoscopic image pair. This exemplary embodiment or another exemplary embodiment may further include measuring a portion of the object in the first stereoscopic image of the stereoscopic image pair; measuring the portion of the object in the second stereoscopic image of the stereoscopic image pair; and establishing a ground truth based on a first dimension of the portion of the object in the first and second stereoscopic images of the stereoscopic image pair having been measured. This exemplary embodiment or another exemplary embodiment may further include measuring the portion of the object in the 3D model; determining whether a second dimension of the portion of the object measured in the 3D model matches the ground truth of the first dimension of the portion of the object in the first and second images of the stereoscopic image pair. This exemplary embodiment or another exemplary embodiment may further provide that if it is determined that the second dimension does not match the first dimension, then correcting, with a correction function, the second dimension to match the first dimension, and then after correcting the second dimension, linking the 3D model to the stereoscopic image pair; or if is determined that the second dimension matches the first dimension, then linking the 3D model to the stereoscopic image pair. This exemplary embodiment or another exemplary embodiment may further include selecting the point in the 3D model that is to be targeted after having linked the 3D model to the stereoscopic image pair; and obtaining geospatial information of the point in the 3D model, wherein the geospatial information is adapted to identify the point as a target. This exemplary embodiment or another exemplary embodiment may further include obtaining an error margin for the geospatial information of the point in the 3D model. This exemplary embodiment or another exemplary embodiment may further include obtaining geospatial information of the point in the first stereoscopic image and the second stereoscopic image of the stereoscopic image pair. This exemplary embodiment or another exemplary embodiment may further provide that obtaining geospatial information of the point in the first stereoscopic image and the second stereoscopic image of the stereoscopic image pair occurs simultaneous to obtaining geospatial information of the point in the 3D model. This exemplary embodiment or another exemplary embodiment may further include viewing a first text box displaying the geospatial information of the point in the first stereoscopic image of the stereoscopic image pair; viewing a second text box displaying the geospatial information of the point in the second stereoscopic image of the stereoscopic image pair; and viewing a third text box displaying the geospatial information of the point in the 3D model. This exemplary embodiment or another exemplary embodiment may further include displaying, in at least the third text box, an error margin that is associated with the geospatial information of the point.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
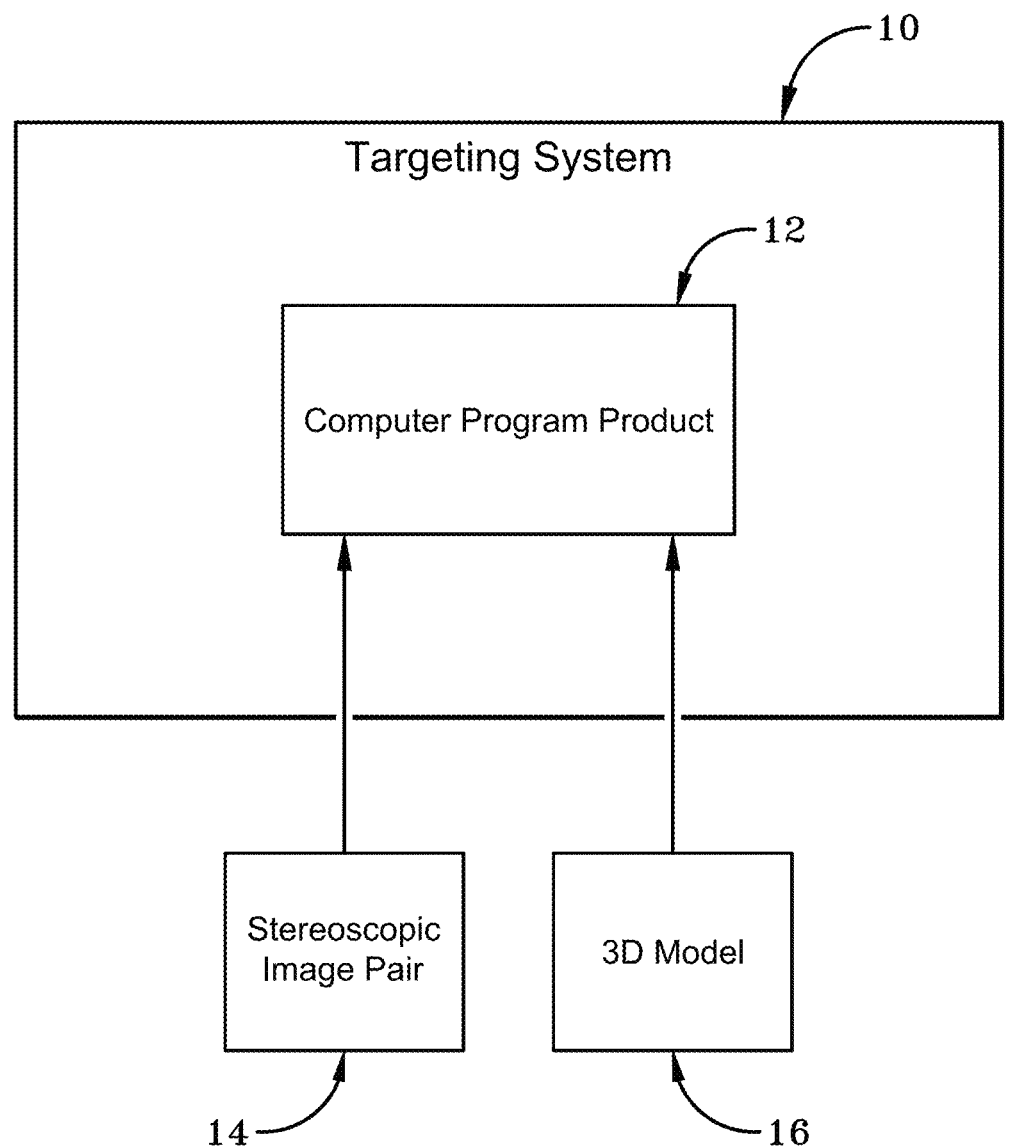
FIG. 1 (FIG. 1) is a schematic view depicting an exemplary embodiment of a targeting system according to one aspect of the present disclosure.

FIG. 1 depicts a targeting system 10 comprising a computer program product 12 that receives a stereoscopic image pair 14 and receives a 3D model 16 as inputs to the computer program product 12. The stereoscopic image pair 14 comprises a first stereo image 14A and a second stereo image 14B. The computer program product 12 receives the first stereoscopic image 14A and the second stereoscopic image 14B that define the stereoscopic image pair 14, wherein an object 18 (FIG. 2A-2B) is shown in the first stereoscopic image 14A and the second stereoscopic image 14B. The computer program product 12 receives the 3D model 16 of the object 18. Then, the computer program product 12 registers the 3D model 16 to the stereoscopic image pair 14.

Figure 2A:
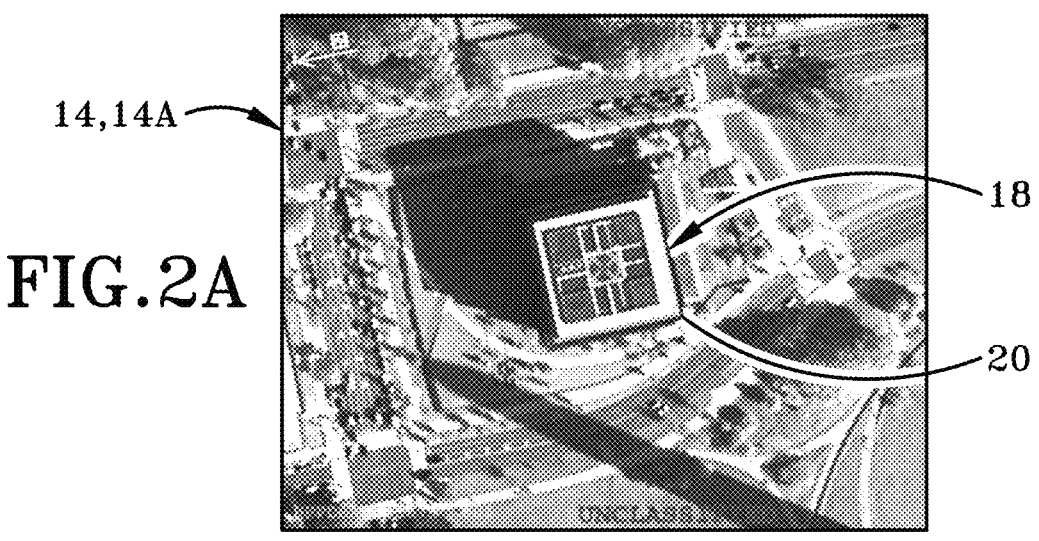
FIG. 2A (FIG. 2A) is a first stereoscopic image utilized in the targeting system according to one aspect of the present disclosure.
Figure 2B:
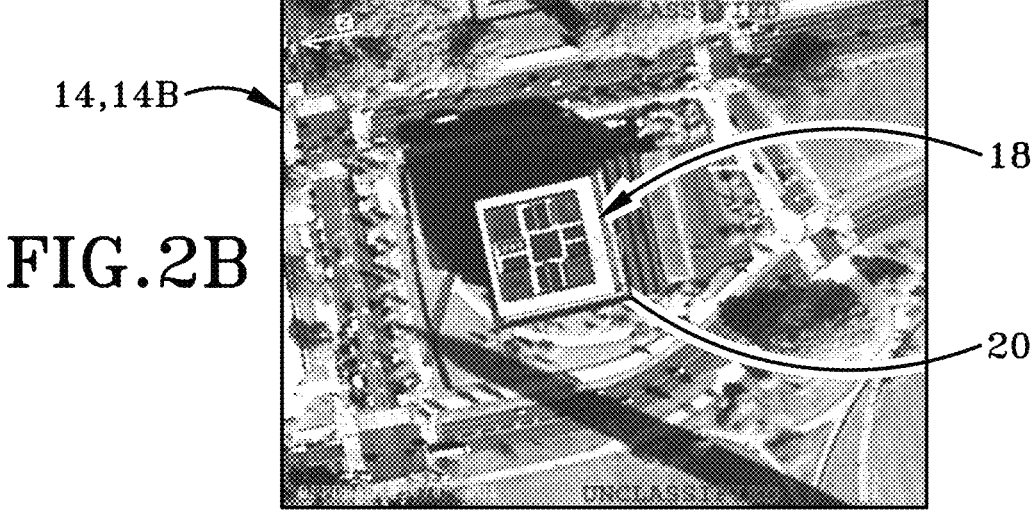
FIG. 2B (FIG. 2B) is a second stereoscopic image utilized in the targeting system according to one aspect of the present disclosure.
Figure 2C:
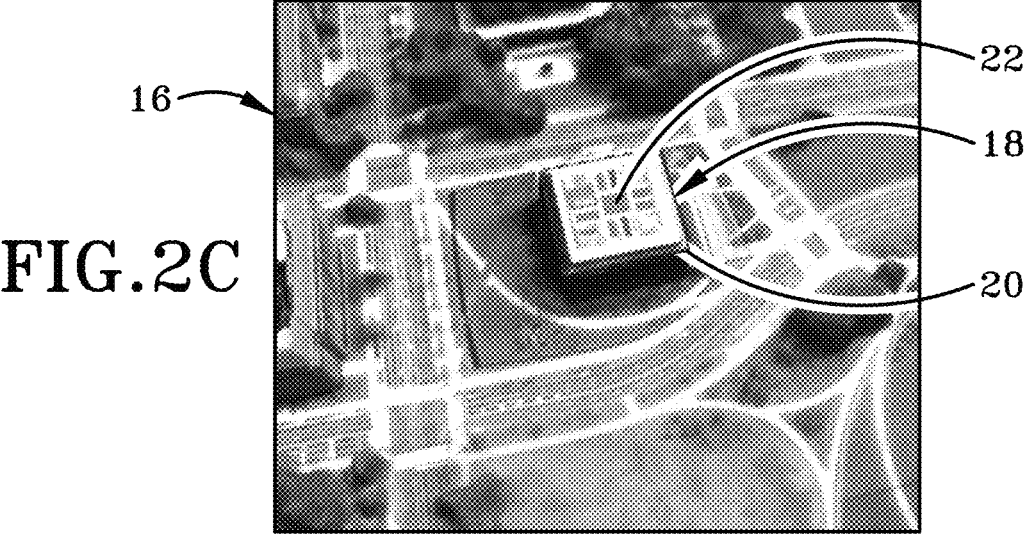
FIG. 2C (FIG. 2C) is an exemplary three-dimensional model utilized in the targeting system according to one aspect of the present disclosure.

FIG. 2A and FIG. 2B depict that within the first image 14A and the second image 14B, there may be a structure or object 18. The object 18 is shown in both the first image 14A and the second image 14B. In one particular embodiment, object 18 is a structure, however the object 18 may be other items as well, such as a road or natural landscape feature. The object 18 is also shown within a 3D model 16, however object 18 is a three-dimensional representation when it is shown in the 3D model 16. The computer program product 12 is configured to register the 3D model 16 containing object 18 to the stereoscopic image pair 14.

There may be a portion 20 of the object 18 that is in the first image 14A of the stereoscopic image pair 14 and the portion 20 of the object 18 is also shown in the second image 14B of the stereoscopic image pair 14. The portion 20 may be measured from the stereoscopic image pair 14. For example, when object 18 is a building the portion 20 of object 18 may be a corner edge of the building that is used to measure the height of the building. Although this example indicated that the portion 20 of the object is an edge of the building, other features of the building, structure, or natural landscape could be utilized to the obtain a measurement. For example, a chimney could be utilized to obtain a height measurement. Additionally, while this example makes reference to obtaining a height measurement, other dimensional measurements may be obtained such as a length or width of the building.

From the stereoscopic image pair 14, the portion 20 of the object 18 that is measured establishes a ground truth or baseline of a first dimension of the portion 20 of the object 18 in the first image 14A and the second image 14B of the stereoscopic image pair.

The 3D model 16 of object 18 also is able to measure the portion 20 of the object 18 that is rendered in the 3D model. The portion 20 is measured in the 3D model 16 and the computer program product 12 determines whether the object dimension, which may be referred to as a second dimension of the object, representative of the portion 20 of the object 18 measured in the 3D model 16 matches the ground truth or baseline of the first dimension of the portion 20 of the object 18 in the first image 14A and the second image 14B of the stereoscopic image pair 14.

If the computer program product 12 determines that the second dimension of the 3D model 16 does not match the first dimension of the stereoscopic image pair 14, then the computer program product 12 applies a correction function to the three-dimensional model. The correction function corrects the second dimension in the 3D model 16 to match the first dimension from the stereoscopic image pair 14. After correcting the 3D model 16, the computer program product 12 links or registers the 3D model to the stereoscopic image pair 14. This ensures that the dimensions and size of the object 18 in the 3D model 16 matched it is registered with that which was determined to be the baseline or ground truth established by the stereoscopic image pair 14. If the computer program product 12 determines that the second dimension from the 3D model 16 matches the first dimension from the stereoscopic image pair 14 then the computer program product 12 may link of register the 3D model 16 to the stereoscopic image pair 14 without applying a correction function.

The computer program product 12 enables a point 22 to be selected in the 3D model 16 of the object 18 that is remote from the portion 20 of the object 18 after having linked the 3D model 16 to the stereoscopic image pair 14. For example, and as will be described in greater detail below, the object 18 may be a building or structure, the portion 20 may be chimney on the building or structure (i.e., object 18), and the point 22 may be an air conditioning unit on the building or structure (i.e., object 18). The computer program product 12 displays or otherwise enables geospatial information of the point 22 in the 3D model 16 to be obtained. The geospatial information of the point 22 is then utilized to identify or target that point 22 for a subsequent operation or mission. For example, identifying the point 22 as a target is a military application enables the point or target to be provided to a munition guidance system. However, the system 10 of the present disclosure also has civilian or nonmilitary uses in which the point 22 could identify a target for other nonmilitary targeting purposes. For example, if the military mission needed to disable an air conditioning unit (e.g., point 22) on the building (i.e., object 18), then the geospatial information of the point 22 will be provided to a mission file to execute the mission to disable the air conditioning unit.

Figure 3:
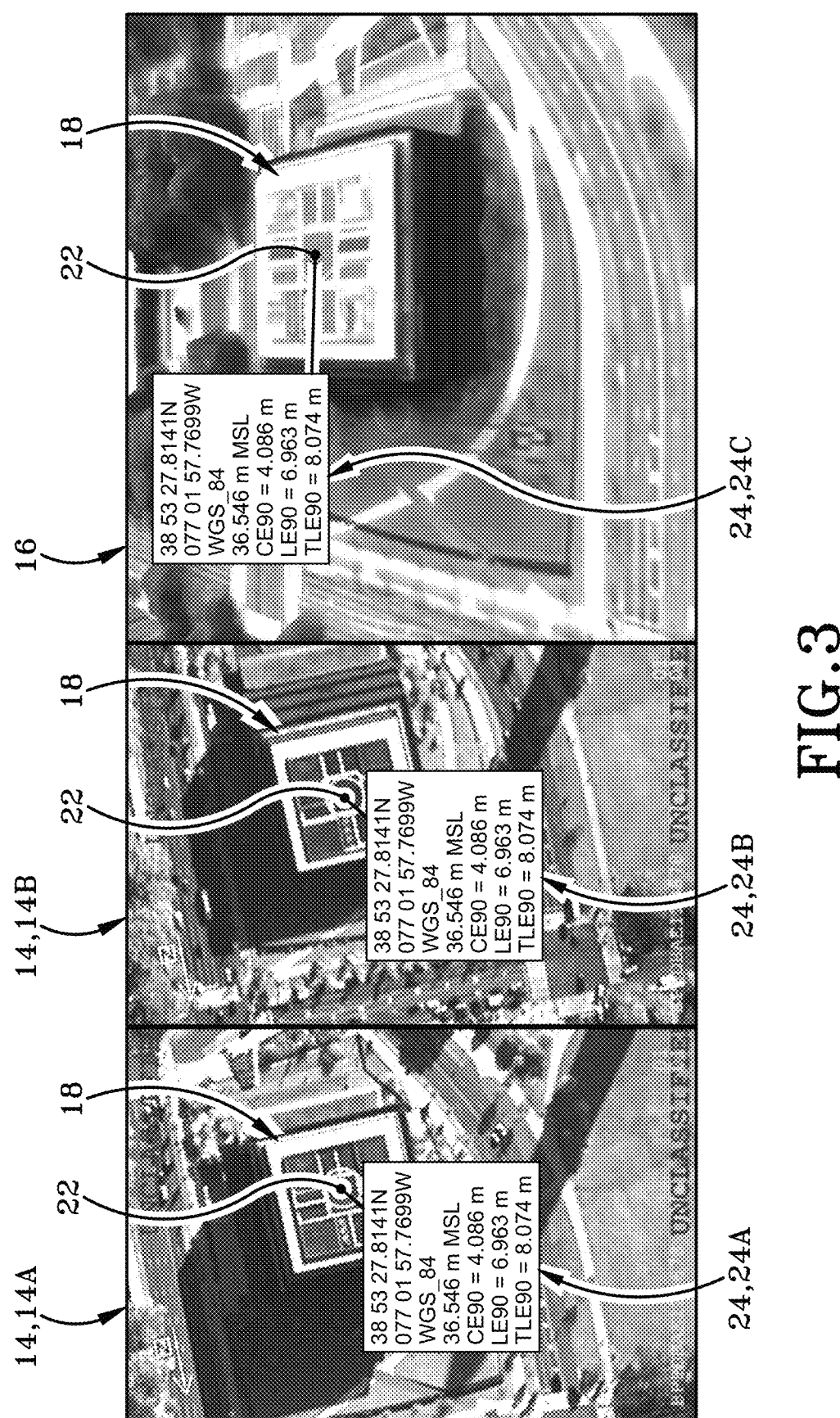
FIG. 3 (FIG. 3) is a representation of the two stereoscopic images adjacent the 3D model depicting data associated with a located point on the three-dimensional model.

FIG. 3 depicts that when the 3D model 16 is linked to the stereoscopic image pair 14 and the point 22 is selected on the 3D model 16, a text box 24 is populated and displays the geospatial information of the point 22. Within the text box 24 is displayed an error margin for the geospatial information of the point 22 in the 3D model 16. However, the error margin may also be displayed in the text box 24 contained in the images 14A, 14B of the stereoscopic image pair 14. For example, there may be a first text box that is displayed or otherwise be able to be viewed of the geospatial information of the point 22 in the first image 14A of the stereoscopic image pair 14. There may be a second text box 24B that is displayed or otherwise able to be viewed of the geospatial information of the point 22 in the second image 14B of the stereoscopic image pair 14. There may be a third text box 24C in the three-dimensional model that displays or otherwise enables to be viewed the geospatial information of the point 22 in the 3D model 16. One advantage of the text box 24, namely the first through third text box 24A-24C is that obtaining the geospatial information on the point 22 in the first image 14A and the second image 14B of the stereoscopic image pairs occurs simultaneous to obtaining the geospatial information of the point 22 in the 3D model 16. Each text box 24A-24B may also display an error margin that is associated with the geospatial information of the point 22B. In another embodiment, the error margin associated with the geospatial information of the point 22 is displayed in at least the third text box 24C.

Having thus described the components of the computer program product 12 of targeting system 10, reference will now be made to its operation and advantages over previous teachings.

Figure 4:
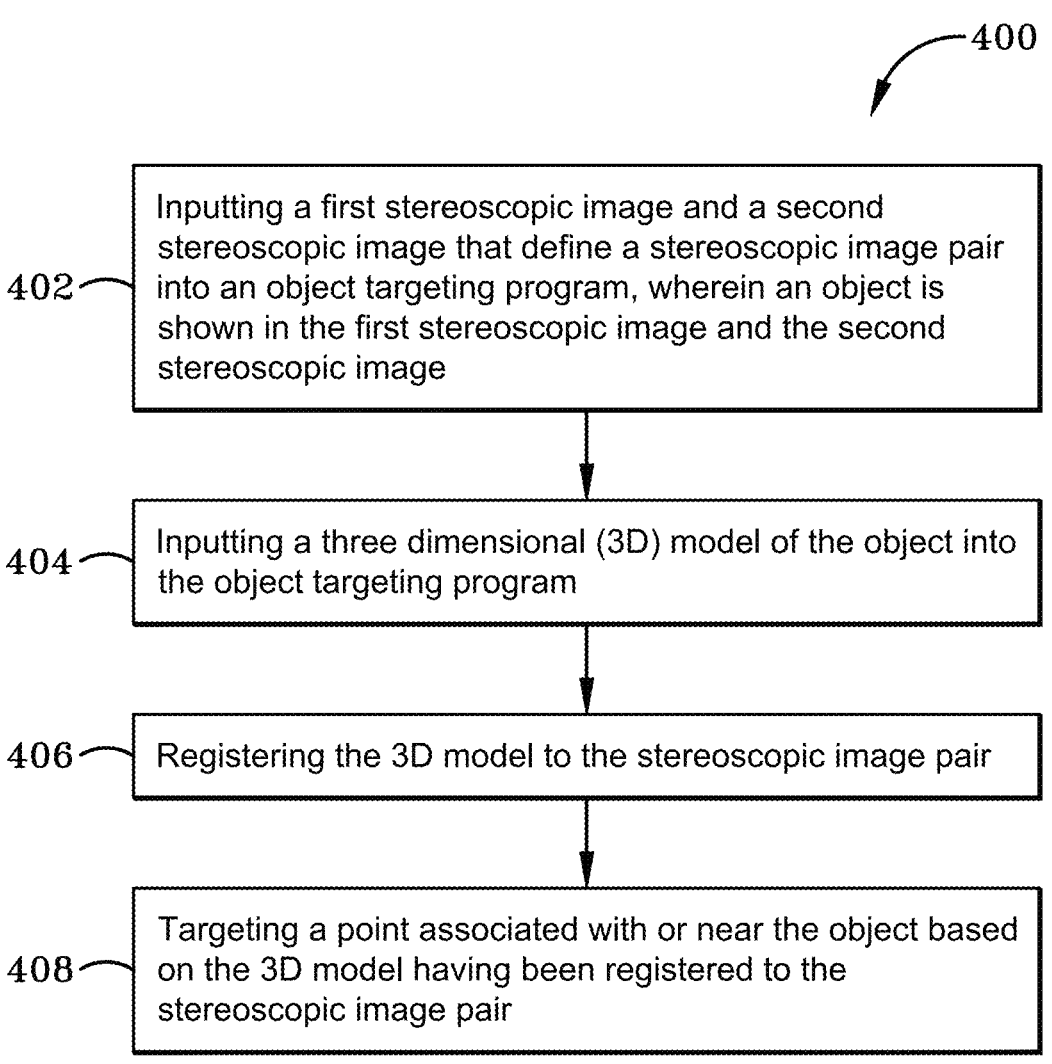
FIG. 4 (FIG. 4) is a flow chart representing an exemplary method of the present disclosure.

For example, FIG. 4 depicts an exemplary object targeting method generally at 400. Method 400 may include inputting a first stereoscopic image and a second stereoscopic image that define a stereoscopic image pair into an object targeting program, wherein an object is shown in the first stereoscopic image and the second stereoscopic image, which is shown generally at 402. Method 400 may include inputting the 3D model 16 of the object 18 into the object targeting program or computer program product 12, which is generally shown at 404. Method 400 may include registering the 3D model 16 to the stereoscopic image pair 14, which is shown generally at 406. Method 400 may include targeting the point 22 associated with or near the object 18 based on the 3D model 16 having been registered to the stereoscopic image pair 14, which is shown generally at 408. Other aspects of system 10, product 12 and method 400 are discussed in greater detail below.

Point mensuration from stereoscope or "stereo" sources requires adding a point to two stereoscopic images. In order for the point to be at the correct Latitude, Longitude, and Height, it requires identifying the same location on the two images. In doing so, stereo visualization with customized stereo viewing hardware is typically used. However, stereo hardware is becoming obsolete with limited support from graphics card providers.

Some programs have split views or split displays. Split views requires point dropping on the views independently or linked to allow removal of x-parallax for determining height.

Typically, when a data analysis wants to identify a point for measuring an object on the ground or on top of a building, the analysis will need to know the latitude, longitude, and height above median sea level for that point that they've placed on a structure in an image. Previously, the analysis would need two stereoscopic or stereo images to measure that point. Stereo images, which constitute a stereo image pair, are obtained from an overhead platform, such as an aircraft or satellite that captures a first image and then moves a slight distance and obtains a second image. The two stereoscopic images of the stereoscopic image pair enable the data analyst to precisely measure at an xyz location. Heretofore, data analysts have required or otherwise needed special hardware to enable the stereoscopic images to be switched into a three-dimensional representation. However, this hardware is becoming obsolete.

Currently, other three dimensional representations, digital data, are being employed to represent objects in a scene. One common three-dimensional source is Google Maps, whereas another 3D source is One World Terrain.

These three-dimensional representations are not always as accurate and the trusted "ground truth" is the information obtained from the stereoscopic images, which as stated previously, is becoming obsolete. Thus, there needs to be a system to bridge the gap between the ground truth that is determined from a stereoscopic image pair that can be registered with a three-dimensional model of data. The present disclosure addresses this gap in the technology and bridges the deficiency between the two technologies utilizing the system and method disclosed herein. Here, the terme "ground truth" is defined as the location of an object along to include an estimate of the error for the location of the object. For example, Google Maps or One World Terrain could each be considered an application that provides ground truth, if the object location also includes information about the accuracy of the coordinates. In some examples, ground truth information is created from a certified peer-reviewed process.

In one particular embodiment, the system 10 (or method 400) of the present disclosure registers the stereoscopic images pair 14 with a 3D model 16 or 3D image data to verify that a point in the 3D image is located in the stereoscopic image pair at that same location. The system 10 (or method 400) of the present disclosure allows analysis to identify a point in the 3D model 16 or 3D imagery and then confirm the accuracy and truth of that point in the 3D model 16 or 3D imagery by comparing it to the stereoscopic image pair that is linked or registered to the 3D model 16.

In order for the system 10 or product 12 or method 400 to verify the point locations within the stereoscopic imagery, a registration element or registration component of the system determines whether the point in the stereoscopic pair 14 of images match or line up with a corresponding point in the 3D imagery or model 16. In order to determine that the points line up properly (i.e., match), the registration function determines that a point identified by a cursor in the stereoscopic image matches a similar point in the 3D model 16. The registration function operates by providing the stereoscopic image pair 14, which are separated in space, and a 3D model 16 or image of the same object or structure is provided as well. If everything was accurate that was input into the system, then the 3D model 16 would line up with the stereoscopic image pair 14.

In some embodiments an analysis will determine that the building (i.e., or any other object) in the 3D model or image is not exactly lined up with the stereoscopic image pair 14. Thus, before the analysis can start obtaining measurements on the 3D model 16 or image, the registration logic must line everything up between the stereoscopic image pair and the 3D model imagery to acceptable tolerances. To accomplish this, the analysis will measure an element (i.e., portion 20) in the stereoscopic image pair 14. In one example, the analysis could measure a fixed structure on a building, such as a chimney, on the first or left image of the stereoscopic pair. Then, the analysis will measure that same structure on the second or right image from the stereoscopic pair. Then, the analysis will measure the same structure (i.e., portion 20), such as the chimney, in the 3D model 16 or imagery. Thus, the same structure is measured and utilized as a baseline in all three images (the first two images of the stereoscopic pair and the 3D images). If the measurements are the same between the three images then registration is complete. If the 3D imagery does not match the stereoscopic pair of images, then a correction function will be applied to the 3D imagery to make it match the stereoscopic image pair. Once the correction function has been applied, then the registration is complete. While reference is made to an operator, the processing can also be performed in the program without user intervention. Alternatively, the present disclosure may perform the analysis and registration entirely through artificial intelligence or machine learning techniques.

In one embodiment, the registration function is accomplished manually by the operator or analyst of the system. However as noted, other embodiments automate this process should it meet the application specific needs of a desired embodiment. When referring to analysis, this can be done manually or semi-manually with an operator involved or automatically via the software program, artificial intelligence or other machine learning techniques.

In one particular embodiment, the results obtained of a dimension of part or portion 20 of a structure or object 18, such as the chimney in this example, establishes the ground truth that will be utilized in the registration. For example, assume the chimney in this example has a height dimension of twenty meters. If the 3D model 16 has a chimney dimension that differs from the twenty meters, then an error or offset is identified so as to allow the 3D image to be corrected based on the ground truth established from the stereoscopic image pair. Once the ground truth of a structure or object 18 is known, then the correction for the 3D model 16 occurs automatically. The correction is then applied to the remainder of the virtual scene in the 3D image. However, it is possible to apply the correction to only a partial amount of the 3D image scene.

Once the 3D model 16 has been registered to the stereoscopic image pair, different structures can be analyzed in the 3D model 16 beyond those utilized to establish the ground truth. For example, when the chimney was used to establish the ground truth and then confirmed that the chimney in the same building in the 3D model 16 or image equaled that of the stereoscopic image pair, an adjacent structure in the 3D image can selected for a different point in the 3D image. For example, another identifying structure can be selected, such as an air conditioning unit, that the analysis would measure (i.e., selecting the second point 22). The analysis may select the point in the 3D model 16 and the system will generate a popup or text box 24 identifying the geospatial information such as latitude, longitude, height, and error accuracy information of that second point 22. The analysis may then review and confirm that the second point 22 selected in the 3D model 16 or image then also matched the information in the stereoscopic image pair 14. This will allow confirmation that the second point 22 also matches and is properly registered to the stereoscopic image pair 14. Thus, a secondary confirmation is established from a second point 22 after having initially registered stereoscopic image pair 14 and 3D model 16 together.

When the analysis selects the second point 22 in the 3D model 16 and the text box 24 generates with the information relating to the second point 22, a similar text box will appear in the stereoscopic image pair 14. The text boxes 24A-24C that are generated in both the 3D model 16 and the stereoscopic image pair 14 identifies the error margin to identify how good the measurement is between the two images that have been linked. This error margin is useful when targeting certain points on a structure. For example, if the analysis identified a point (such as point 22) on a structure or object 18 to target for a munitions strike, then the error margin will identify how confident the analysis is for placing the munitions strike at the precise location. The error margin provided the analysis with an amount of confidence that the identified latitude, longitude and height provided in the text box are within a certain amount of accuracy. Based on the error margins, the analysis may select what type of munition is needed for targeting a certain point on the structure. For example if there is a greater error margin, then a more precise munition may be needed. However, if there is a very low error margin, then a less precise munition may be needed. Additionally, if the error margin is too high, the analysis may repeat the process until the error margin is reduced within or to an acceptable range for the desired level required for that operation or mission. Once the point is identified or targeted with a certain amount of error threshold then that data is provided to a subsequent system to utilize the data. For example, this information may be provided to a munitions system to guide a munition to achieve its objective in destroying a selected target.

With respect to the text box 24 that pops up, in addition to the latitude, longitude, and height, that is provided for the secondary point, the system also identifies the circular error (CE), which is the x-y error of the point. The text box also identify linear error (LE), which is the vertical error of the secondary point. The text box also identifies the total error (TLE), which is the sum of the squares of the LE and CE as representative of the total error.

The system 10 of the present disclosure may additionally include inputs from one or more sensors that sense or gather data pertaining to the surrounding environment or operation of the device, assembly, or system. Some exemplary sensors capable of being electronically coupled with the system 10 of the present disclosure (either directly connected to the device, assembly, or system of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The system 10 of the present disclosure may include wireless communication logic coupled to sensors on the device, assembly, or system. The sensors gather data and provide the data to the wireless communication logic. Then, the wireless communication logic may transmit the data gathered from the sensors to a remote device. Thus, the wireless communication logic may be part of a broader communication system, in which one or several devices, assemblies, or systems of the present disclosure may be networked together to report alerts and, more generally, to be accessed and controlled remotely. Depending on the types of transceivers installed in the device, assembly, or system of the present disclosure, the system may use a variety of protocols (e.g., Wifi, ZigBee, MiWi, Bluetooth) for communication. In one example, each of the devices, assemblies, or systems of the present disclosure may have its own IP address and may communicate directly with a router or gateway. This would typically be the case if the communication protocol is WiFi.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including at least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A computer program product for targeting one or more points in a three dimensional (3D) model, the computer program product including at least one non-transitory computer readable storage medium in operative communication with a computer processing unit (CPU), the storage medium having instructions stored thereon that, when executed by the CPU, implement a process to register the 3D model with a stereoscopic image pair, the process comprising:

receiving a first stereoscopic image and a second stereoscopic image that define the stereoscopic image pair, wherein an object is shown in the first stereoscopic image and the second stereoscopic image;

receiving a 3D model of the object;

registering the 3D model to the stereoscopic image pair;

measuring a portion of the object in the 3D model;

generating geospatial information for the object and providing the geospatial information to another system;

measuring, simultaneously, (i) a portion of the object in the first stereoscopic image of the stereoscopic image pair, (ii) the portion of the object in the second stereoscopic image of the stereoscopic image pair, and (iii) the portion of the object in the 3D model;

establishing a ground truth based on a first dimension of the portion of the object having been measured simultaneously in the first stereoscopic image, the second stereoscopic image, and the 3D model; and determining whether a second dimension of the portion of the object measured in the 3D model matches the ground truth of the first dimension of the portion of the object in the first and second stereoscopic images of the stereoscopic image pair.

2. The computer program product of claim 1, the process further comprising:

wherein if it is determined that the second dimension does not match the first dimension of the object, then correcting, with a correction function, the second dimension to match the first dimension, and after correcting then registering the 3D model to the stereoscopic image pair; or wherein if is determined that the second dimension matches the first dimension, then registering the 3D model to the stereoscopic image pair.

3. The computer program product of claim 1, the process further comprising:

selecting a point in the 3D model that is remote from a portion of the object after having registered the 3D model to the stereoscopic image pair;

obtaining geospatial information of the point in the 3D model; and validating the geospatial information in the 3D model based on the stereoscopic image pair.

4. The computer program product of claim 3, the process further comprising:

obtaining an error margin for the geospatial information of the object in the 3D model.

5. The computer program product of claim 3, the process further comprising:

obtaining geospatial information of the point in the first stereoscopic image and the second stereoscopic image of the stereoscopic image pair, wherein the geospatial information comprises latitude, longitude and height of the point.

6. The computer program product of claim 5, wherein obtaining geospatial information of the point in the first stereoscopic image and the second stereoscopic image of the stereoscopic image pair occurs simultaneous to obtaining geospatial information of the point in the 3D model.

7. The computer program product of claim 5, the process further comprising:

displaying the geospatial information of the point in the first stereoscopic image of the stereoscopic image pair;

displaying the geospatial information of the point in the second stereoscopic image of the stereoscopic image pair; and displaying the geospatial information of the point in the 3D model.

8. The computer program product of claim 1, the process further comprising:

generating and displaying an error margin that is associated with the geospatial information of a point in the 3D model that is remote from a portion of the object after having registered the 3D model to the stereoscopic image pair.

9. An object targeting method comprising:

inputting a first stereoscopic image and a second stereoscopic image that define a stereoscopic image pair into an object targeting program, wherein an object is shown in the first stereoscopic image and the second stereoscopic image;

inputting a three dimensional (3D) model of the object into the object targeting program;

registering the 3D model to the stereoscopic image pair;

generating geospatial information for a point in the 3D model, wherein the point is associated with or near the object based on the 3D model having been registered to the stereoscopic image pair;

targeting the point;

measuring, simultaneously, (i) a portion of the object in the first stereoscopic image of the stereoscopic image pair, (ii) the portion of the object in the second stereoscopic image of the stereoscopic image pair, and (iii) the portion of the object in the 3D model;

establishing a ground truth based on a first dimension of the portion of the object in the first and second stereoscopic images of the stereoscopic image pair having been measured; and determining whether a second dimension of the portion of the object measured in the 3D model matches the ground truth of the first dimension of the portion of the object in the first and second images of the stereoscopic image pair.

10. The method of claim 9, further comprising:

wherein if it is determined that the second dimension does not match the first dimension, then correcting, with a correction function, the second dimension to match the first dimension, and then after correcting the second dimension, registering the 3D model to the stereoscopic image pair; or wherein if is determined that the second dimension matches the first dimension, then registering the 3D model to the stereoscopic image pair.

11. The method of claim 9, further comprising:

selecting a point in the 3D model that is to be targeted after having registered the 3D model to the stereoscopic image pair; and obtaining geospatial information of the point in the 3D model;

validating the geospatial information in the 3D model based on the stereoscopic image pair; and identifying the point as the object to be targeted.

12. The method of claim 11, further comprising:

obtaining an error margin for the geospatial information of the point in the 3D model.

13. The method of claim 11, further comprising:

obtaining geospatial information of the point in the first stereoscopic image and the second stereoscopic image of the stereoscopic image pair.

14. The method of claim 13, wherein obtaining geospatial information of the point in the first stereoscopic image and the second stereoscopic image of the stereoscopic image pair occurs simultaneous to obtaining geospatial information of the point in the 3D model.

15. The method of claim 13, further comprising:

viewing a first text box displaying the geospatial information of the point in the first stereoscopic image of the stereoscopic image pair;

viewing a second text box displaying the geospatial information of the point in the second stereoscopic image of the stereoscopic image pair; and viewing a third text box displaying the geospatial information of the point in the 3D model.

16. The method of claim 15, further comprising:

displaying, in at least the third text box, an error margin that is associated with the geospatial information of the point.

* * * * *